(12) United States Patent
Cardellini (10) Patent No.: US 6,260,971 B1
(45) Date of Patent: Jul. 17, 2001

(54) MOTION PICTURE CAMERA HEAD TIE-DOWN DEVICE

(75) Inventor: Steven L. Cardellini, Corte Madera, CA (US)

(73) Assignee: Steve Cardellini, Corte Madera, CA (US)

( * ) Notice: Subject to any disclaimer, the term of this patent is extended or adjusted under 35 U.S.C. 154(b) by 0 days.

(21) Appl. No.: 09/338,444

(22) Filed: Jun. 22, 1999

(51) Int. Cl.$^7$ .............................. G03B 17/00; F16M 11/02; F16M 11/04; A47G 29/00
(52) U.S. Cl. .................. 352/243; 248/177.1; 248/187.1; 248/689; 396/419; 396/425
(58) Field of Search ........................ 352/243; 248/177.1, 248/187.1, 689; 292/37; 396/419, 425, 428; 403/326

(56) References Cited

U.S. PATENT DOCUMENTS

| | | | |
|---|---|---|---|
| 298,889 | * | 5/1884 | Pritchard ................... 292/37 |
| 300,987 | * | 6/1884 | Leinert ...................... 292/37 |
| 534,912 | | 2/1895 | Perry, Jr. .................. 248/187.1 |
| 614,732 | * | 11/1898 | Leseman ................... 70/168 |
| 822,562 | | 6/1906 | Tucker ...................... 292/37 |
| 1,289,943 | * | 12/1918 | Smith ....................... 248/187.1 |
| 1,386,664 | | 8/1921 | Vaeth ....................... 248/186.2 |
| 1,560,489 | | 11/1925 | Yager ........................ 292/37 |
| 1,846,382 | | 2/1932 | Bing .......................... 248/187.1 |
| 1,901,613 | | 3/1933 | Smith ........................ 70/259 |
| 2,664,611 | * | 1/1954 | Shomber .................. 24/635 |
| 2,834,567 | | 5/1958 | Young ....................... 248/187.1 |
| 3,006,052 | | 10/1961 | Stickney et al. ........... 248/187.1 |
| 3,029,053 | | 4/1962 | Loehnis .................... 248/187.1 |
| 3,184,196 | | 5/1965 | Dent .......................... 248/187.1 |
| 3,356,325 | | 12/1967 | Schnase ..................... 248/187.1 |
| 3,449,860 | | 6/1969 | Franks, Jr. et al. ......... 49/317 |
| 4,040,587 | | 8/1977 | Gottschalk et al. ......... 248/185 |
| 4,085,915 | | 4/1978 | Song et al. ................. 248/187.1 |
| 4,114,933 | * | 9/1978 | Jankelewitz et al. ....... 292/37 |
| 4,342,207 | * | 8/1982 | Holmes et al. ............. 70/119 |
| 4,763,151 | | 8/1988 | Klinger ...................... 396/419 |
| 4,929,973 | | 5/1990 | Nakatani .................... 248/177.1 |
| 5,333,023 | | 7/1994 | Oxford ....................... 396/428 |
| 5,785,286 | | 7/1998 | Hiesinger et al. .......... 248/187.1 |
| 5,870,641 | | 2/1999 | Chrosziel .................... 396/425 |

OTHER PUBLICATIONS

Layout Drawing for Panavision Gear Head (2) Speed Mar. 21, 1974.

* cited by examiner

*Primary Examiner*—David M. Gray
*Assistant Examiner*—Rodney Fuller
(74) *Attorney, Agent, or Firm*—Stallman & Pollock LLP (57) ABSTRACT

A motion picture camera head tie-down device and method for securing a motion picture camera head to a camera mount, such as the Mitchell mount. The camera head tie-down device includes a first disk concentrically attached to a second disk. The first disk is contoured to receive a motion picture camera head and the second disk has a plurality of radially extending grooves. A rotatable knob having a spiral thread on a flat surface is positioned such that the spiral thread engages with threads on retractable jaws that are mounted in the grooves of the second disk. A threaded screw passes through the central bores of the first disk, the second disk, and the knob and into a tapped hole in the motion picture camera head. To secure the camera head to the camera mount, the knob is rotated to extend the jaws for engagement with the camera mount.

22 Claims, 7 Drawing Sheets

MOTION PICTURE CAMERA HEAD TIE-DOWN DEVICE

BACKGROUND OF THE INVENTION

1. Field of the Invention

The present invention relates to the field of motion picture cameras and, more particularly to a motion picture camera head tie-down device used as a mechanical connector between a motion picture camera head and a tripod mount, camera dolly, or camera crane.

2. Description of the Related Art

When a motion picture camera is positioned on a static base, the motion picture camera is mounted to a camera head that is supported by a tripod mount or another type of camera mount, such as a camera dolly or crane. There are a variety of tripods and mounts for mounting cameras. Different mounts are suitable for different purposes. For example, some tripods or mounts are suitable for filming that takes place low to the ground while other tripods or mounts are suitable for filming on an uneven surface, such as a staircase.

Typically, a conventional connecting feature, such as the Mitchell mount, is formed on top of the tripod or other form of camera mount, such as a camera dolly or a camera crane. The Mitchell mount is a circular ring having a standard shape that allows standard camera heads to be mounted to it. An alternative to the Mitchell mount is the conventional 150 mm diameter ball camera mount.

Typically, a motion picture camera is mounted to a camera head and the camera head is, in turn, mounted to a tripod or other mount. Generally, the camera head is secured to a Mitchell mount, which is formed on top of the tripod. The camera head has a disk-like structure on its bottom surface that must be secured to the Mitchell mount to stabilize the camera. A conventional means of attaching the camera head to the Mitchell mount involves first seating the disk-like structure of the camera head onto the circular ring shaped Mitchell mount. The user then reaches underneath the Mitchell mount and feeds a threaded stud through the Mitchell mount and up into a tapped hole in the camera head. Finally, the user tightens the stud to secure the camera head in place. Alternatively, instead of feeding a stud into a tapped hole in the camera head, a 2.75 inch diameter male threaded pipe may be mated with a nut to attach the camera head to the Mitchell mount.

Securing the camera head to the Mitchell mount in this manner is cumbersome for the user because it is difficult for the user to reach underneath the Mitchell mount to feed the threaded stud through to the camera head while holding the camera head in place. It is especially difficult for the user to secure the camera head to the Mitchell mount where the tripod is low to the ground. There is therefore a need for a camera head tie-down device that allows a user to easily secure a conventional camera head to a mounting device, such as the Mitchell mount, without having to feed a stud into the camera head from underneath the mounting device.

SUMMARY OF THE INVENTION

The present invention is a camera head tie-down device for simplified connection and disconnection of a motion picture camera head and a camera mounting device, such as a Mitchell mount. The present invention eliminates the need to feed a threaded stud from underneath the Mitchell mount. The head tie-down device of the present invention comprises a first disk having a central bore, a second disk having a central bore and a plurality of grooves and being concentrically attached to the first disk, a rotatable knob having a central bore and a spiral thread on a flat surface where the spiral thread is centered around the central bore, a plurality of retractable angled jaws with one of the jaws being slidably mounted in each of the grooves and each jaw having threads on a flat surface engaging with the spiral thread on the knob, a knob having a spiral thread on a flat surface, and a threaded screw fitting through the central bore of the knob, the central bore of the second disk, and the central bore of the first disk.

BRIEF DESCRIPTION OF THE DRAWINGS

The invention will be better understood by reference to the attached figures in which.

DETAILED DESCRIPTION OF THE INVENTION

The present invention is a camera head tie-down device 100 for securing a conventional motion picture camera head 200 to a camera mounting device, such as the Mitchell mount 300. In addition to being used for securing camera heads 200 to Mitchell mounts 300, the camera head tie-down device 100 may also be used in conjunction with accessories for Mitchell-type mounts, such as camera risers, camera off-set plates, and ratchet offsets.

Figure 1:
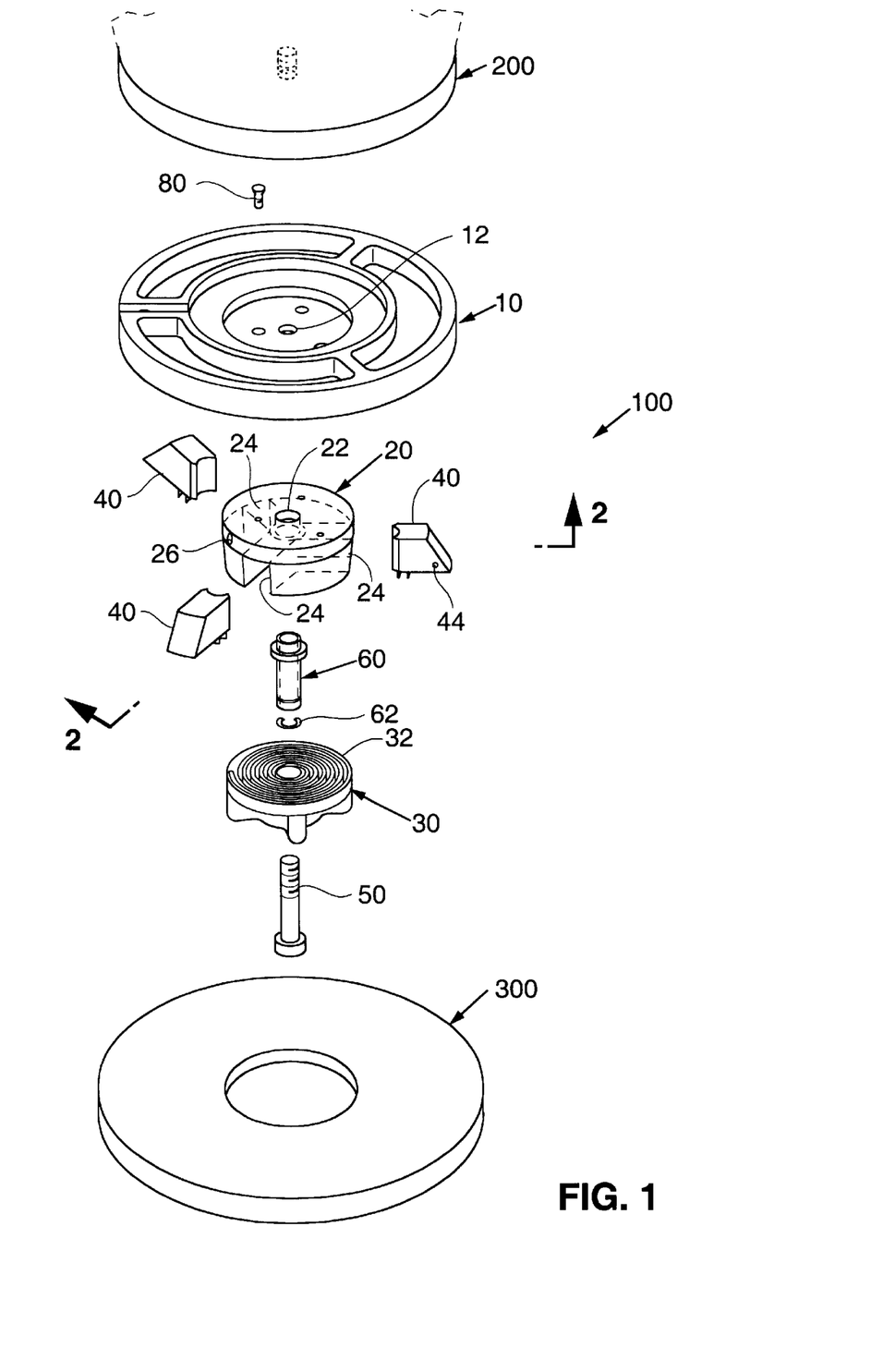
FIG. 1 is an exploded perspective view of an embodiment of a camera head tie-down device according to the present invention and a Mitchell mount.

An embodiment of the invention will be described with reference to FIGS. 1–11. Referring to FIG. 1, the camera head tie-down device 100 generally includes a first disk 10, a second disk 20, a knob 30, a plurality of retractable jaws 40, and a threaded screw 50 that passes through the first disk 10, the second disk 20, and the knob 30.

Figure 4:
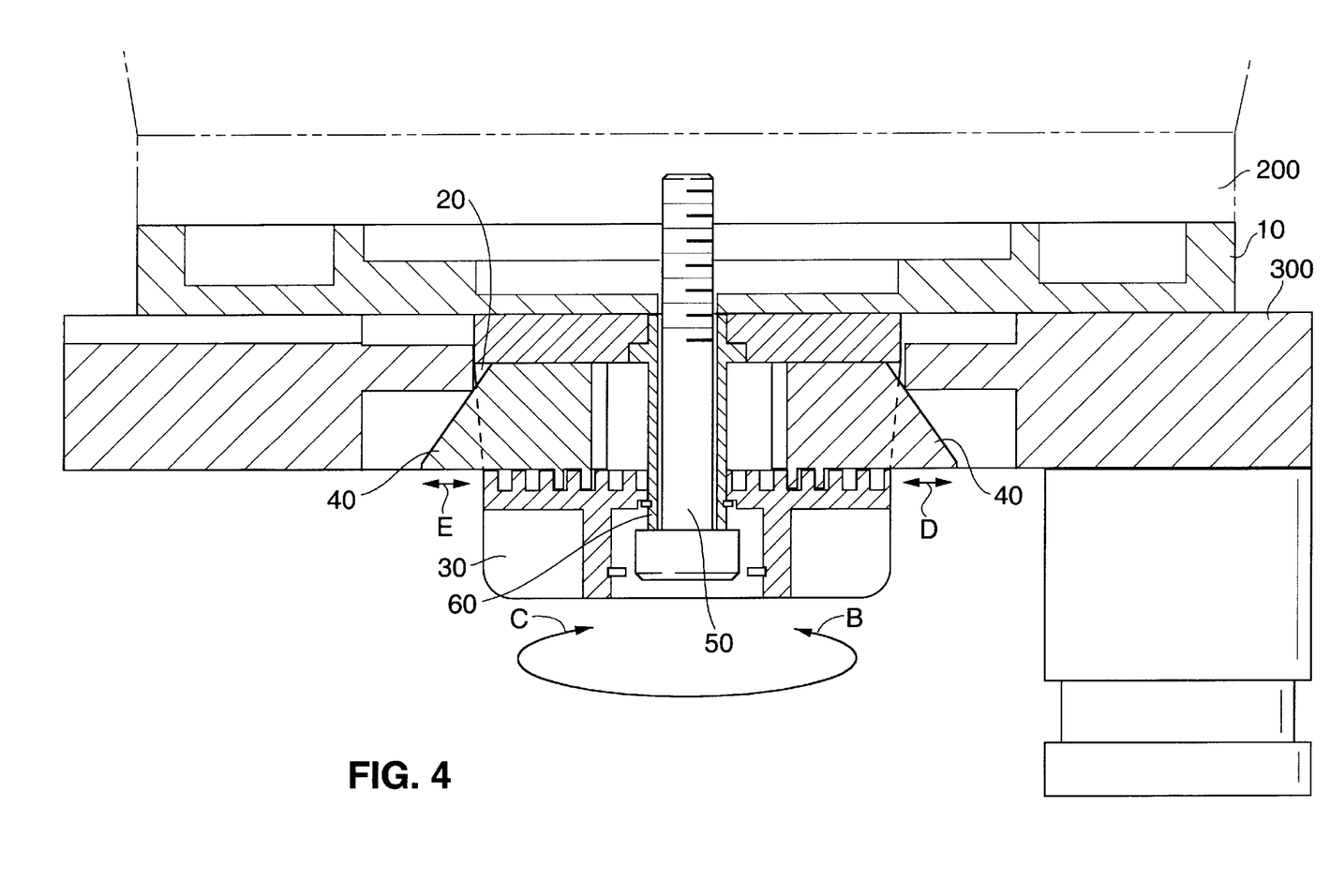
FIG. 4 is a side cross-sectional view of the camera head tie-down device of FIG. 1 mounted to a camera head and to a Mitchell mount.

The first disk 10 has a bore 12 in the center to allow the threaded screw 50 to pass through to a corresponding bore in the camera head 200. As shown in FIG. 4, when the assembled camera head tie-down device 100 is mounted to the Mitchell mount 300, the first disk 10 rests flush against both the camera head 200 and the Mitchell mount 300. The top surface of the first disk 10 is preferably contoured with recesses to receive the circular portion of the camera head 200, as shown in FIG. 1. In a preferred embodiment, the first disk 10 is 0.575 inch thick and has an outer diameter of 7.00 inches. The first disk 10 is preferably formed of 6061 aluminum.

Figure 2:
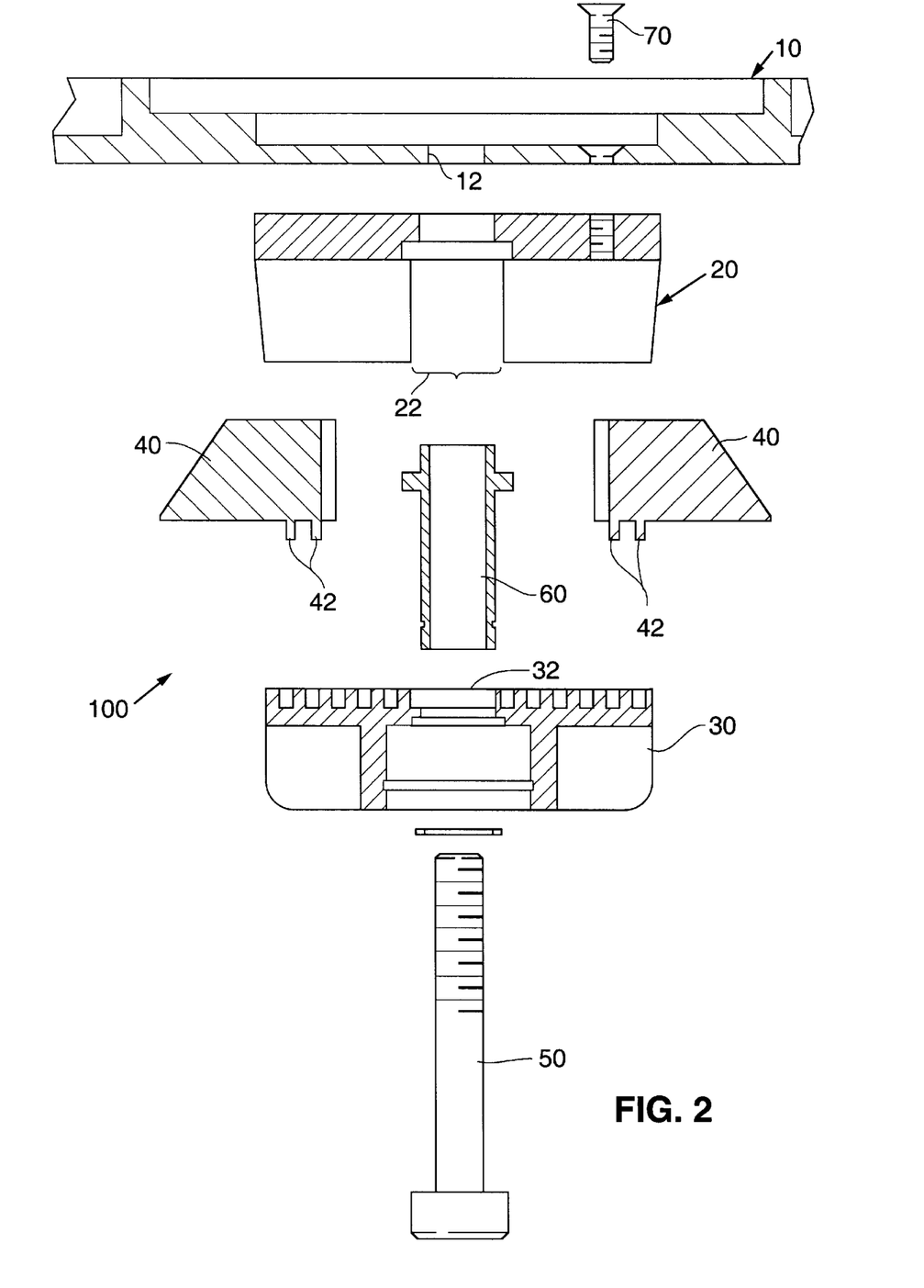
FIG. 2 is an exploded side cross-sectional view of the camera head tie-down device of FIG. 1.
Figure 3:
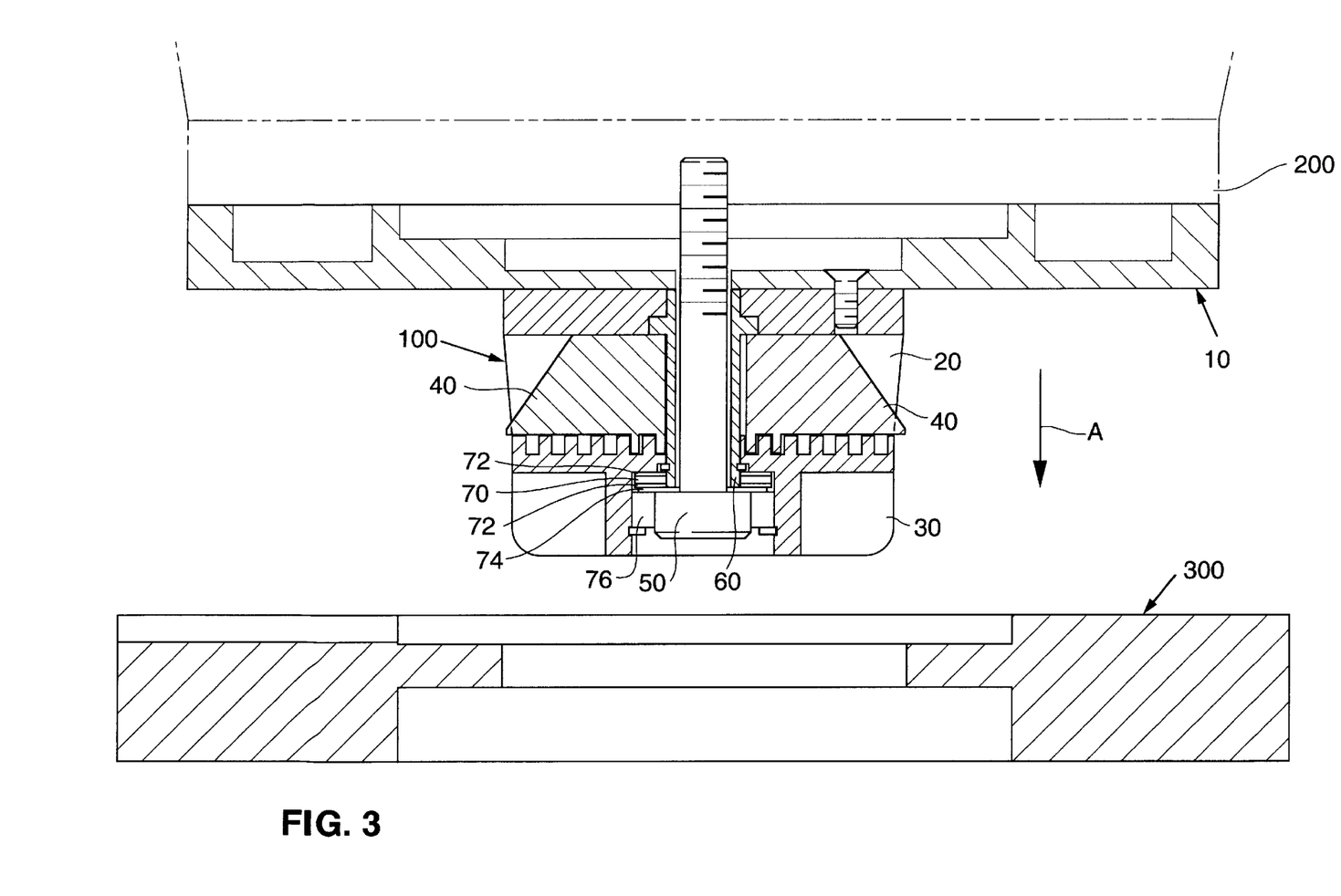
FIG. 3 is a side cross-sectional view of the camera head tie-down device of FIG. 1 mounted to a camera head and of a Mitchell mount to which the camera head tie-down device is to be mounted.
Figure 8:
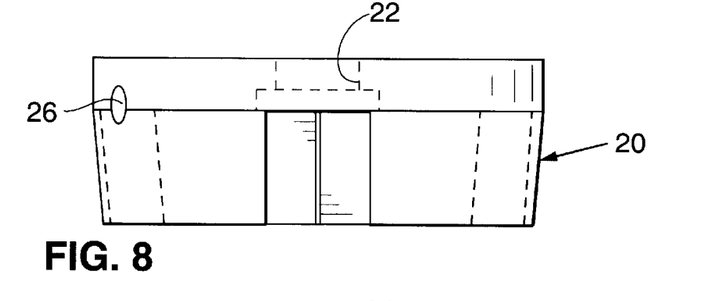
FIG. 8 is a side elevation view of the second disk of the camera head tie-down device.
Figure 9:
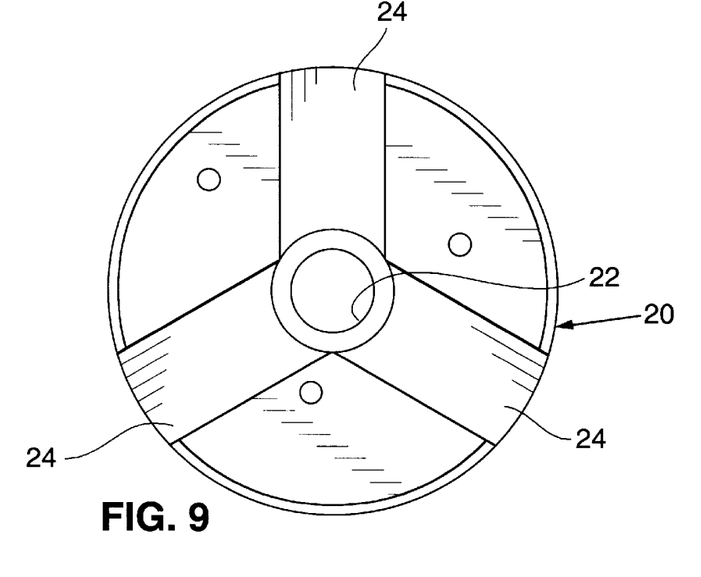
FIG. 9 is a bottom plan view of the second disk of the camera head tie-down device.

Referring to FIGS. 8 and 9, the second disk 20 has a central bore 22 that is large enough for the threaded screw 50 to pass through it. As shown in FIGS. 2–4, the second disk 20 is concentrically affixed to the first disk 10 such that the central bores 12, 22 of the first and second disks 10, 20 line up when the camera head tie-down device 100 is assembled.

In a preferred embodiment, the second disk 20 is affixed to the first disk 10 with at least one flat head bolt 80 that is flush, or slightly below flush, with the upper surface of the first disk 10. Preferably, the first disk 10 and the second disk 20 are held together by three flat head bolts 80 are spaced 120° apart. As shown in FIG. 1, the first disk 10 and the second disk 20 are configured with holes through which the flat head bolts 80 pass for bolting the first and second disks 10, 20 together.

The second disk 20 must have an outer diameter smaller than that of the central opening of the Mitchell mount 300 or other mount to which the camera head tie-down device 100 is mounted such that the second disk 20 may fit through the central circular opening of the Mitchell mount 300, as shown in FIG. 4. As shown in FIG. 8, the side surface of the second disk 20 is preferably slightly tapered inward to facilitate insertion and removal of the second disk 20 into the opening in the Mitchell mount 300. In a preferred embodiment, the second disk 20 has an outer diameter of 2.725 inches and is formed of 6061 aluminum.

There are a plurality of grooves 24 on the bottom surface of the second disk 20, as shown in FIG. 9. The grooves 24 run radially from the central bore 22 to the outer edge of the second disk 20. In a preferred embodiment, the second disk 20 has three grooves 24 that are spaced 120° apart, as shown in FIG. 9.

Figure 5:
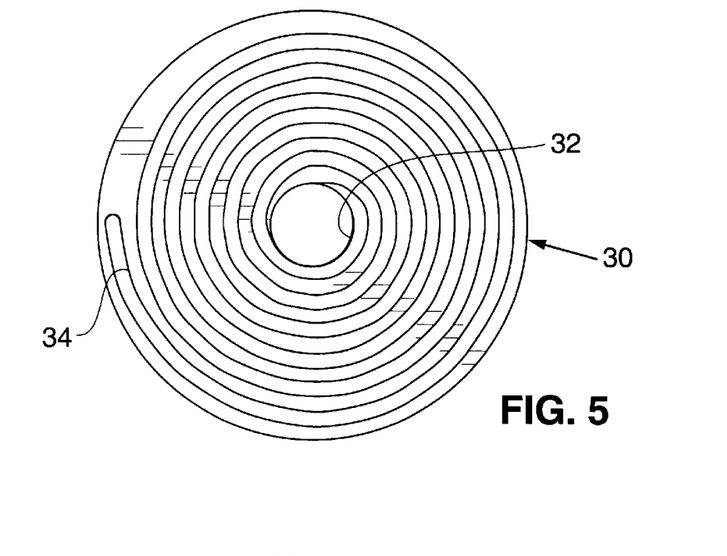
FIG. 5 is a top plan view of the knob of the camera head tie-down device.
Figure 6:
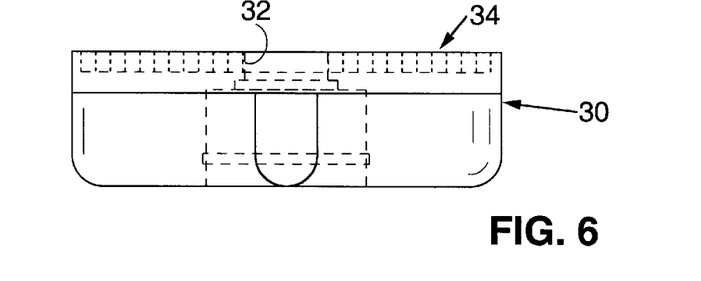
FIG. 6 is a side elevation view of the knob of the camera head tie-down device.
Figure 7:
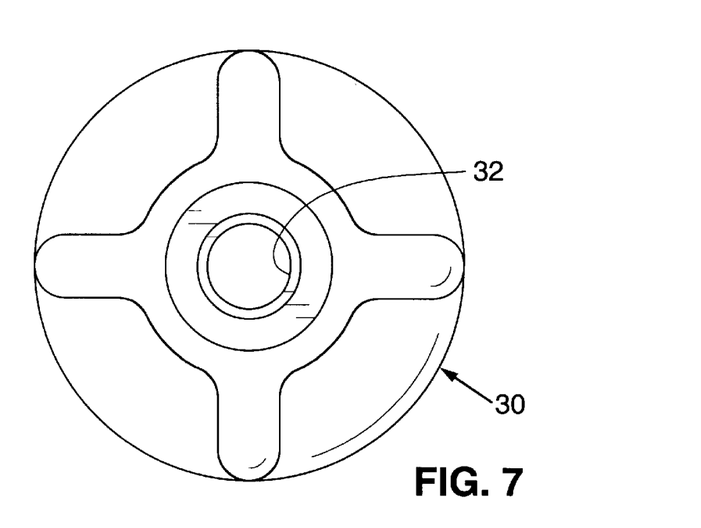
FIG. 7 is a bottom plan view of the knob of the camera head tie-down device.

As shown in FIGS. 5–7, the knob 30 has a bore 32 in the center that allows the threaded screw 50 to pass through the knob 30. FIG. 5 is a top plan view of the knob 30. As shown in FIG. 5, the knob 30 has a spiral thread 34 on its flat upper surface. The spiral thread 34 is preferably formed in a clockwise direction, starting from the central bore 32 and continuing in a clockwise direction to the outer edge of the knob 30. Alternatively, the spiral thread 34 may be formed in a counter-clockwise direction. The spiral thread 34 preferably ends 1/16 inch from the outer edge of the knob 30. In a preferred embodiment, the spiral thread 34 forms "square" thread grooves, as shown in FIG. 6.

The top portion of the knob 30 is preferably circular in shape. As shown in FIG. 7, the bottom portion of the knob 30 has a substantially X-shaped handle portion configured for rotation of the knob 30 by the user. In a preferred embodiment, the knob 30 is formed of electro-less nickel plated steel.

Referring to FIG. 1, a jaw 40 is slidably positioned in each groove 24 of the second disk 20. Each jaw 40 has an outer side inclined surface. In a preferred embodiment, the surface is inclined at 35°. The inner side surface of each jaw 40 is curved such that the inner side surface of the jaw 40 may rest flush against the outer surface of the tubular spacer 60. The top surface of each jaw 40 is parallel to the bottom surface of the jaw 40.

Figure 10:
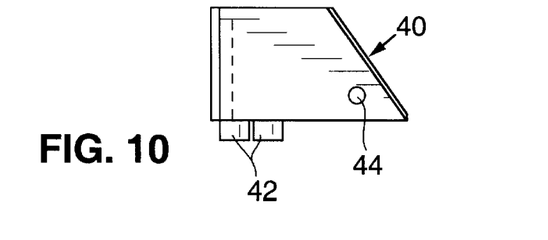
FIG. 10 is a side elevation view of a retractable jaw of the camera head tie-down device.
Figure 11:
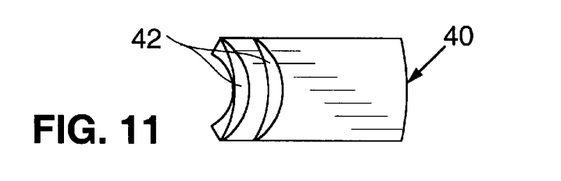
FIG. 11 is a bottom plan view of a retractable jaw of the camera head tie-down device.

Referring to FIGS., 10 and 11, each jaw 40 has at least two arcuate threads 42 on the bottom surface. In a preferred embodiment, the threads 42 are crescent-shaped. The threads 42 correspond to the spiral thread 34 of the knob 30. When the camera head tie-down device 100 is assembled, the threads 42 of the jaws 40 engage with the spiral thread 34 of the knob 30. As shown in FIG. 10, a spring plunger 44 may be provided on one of the jaws 40 as a safety device. The spring plunger 44 provides some resistance as the jaws 40 are retracted. If the jaws 40 are retracted accidentally, the spring plunger 44 may prevent the camera head 200 from becoming accidentally disengaged from the Mitchell mount 300.

The camera head tie-down device 100 is assembled by placing a jaw 40 in each groove 24 of the second disk 20 and positioning the second disk 20 between the first disk 10 and the knob 30, with the arcuate threads 42 facing the spiral thread 34 of the knob 30, as shown in FIGS. 1 and 2. All central bores 12, 22, 32 of the first disk 10, the second disk 20, and the knob 30, respectively, line up when camera head tie-down device 100 is assembled by passing the threaded screw 50 through the central bores 12, 22, 32 and tightening the screw 50 to the tapped hole in the camera head 200. As shown in FIG. 3, when the head tie-down device 100 is fully assembled, the threaded screw 50 has a length greater than the thicknesses of the first disk 10, the second disk 20, and the knob 30 combined such that the threaded screw 50 has a free end extending upwardly from disk 10, which, as shown in FIG. 3, is engaged with the camera head 200 during use.

As shown in FIGS. 1–4, a tubular spacer 60 may be positioned between the second disk 20 and the knob 30 and rests within the central bores of the second disk 20 and the knob 30. The tubular spacer 60 properly positions the knob 30 and allows the threaded screw 50 to pass through both the second disk 20 and the knob 30. The tubular spacer 60 also serves as a stop point when the jaws 40 are retracted. The curvature of the jaws 40 may be configured to engage with the curvature of the tubular spacer 60.

As shown in FIG. 1, a C-clip 62 is placed in the camera head tie-down device 100 to keep the separate parts of the camera head tie-down device 100 together when the threaded screw 50 is removed. As shown in FIG. 1, further holding together the camera head tie-down device 100 is a bolt (not shown) through a tapped hole 26 in the second disk 20, which buts up against the tubular spacer 60 and holds the spacer 60 in place by friction.

Figure 3A:
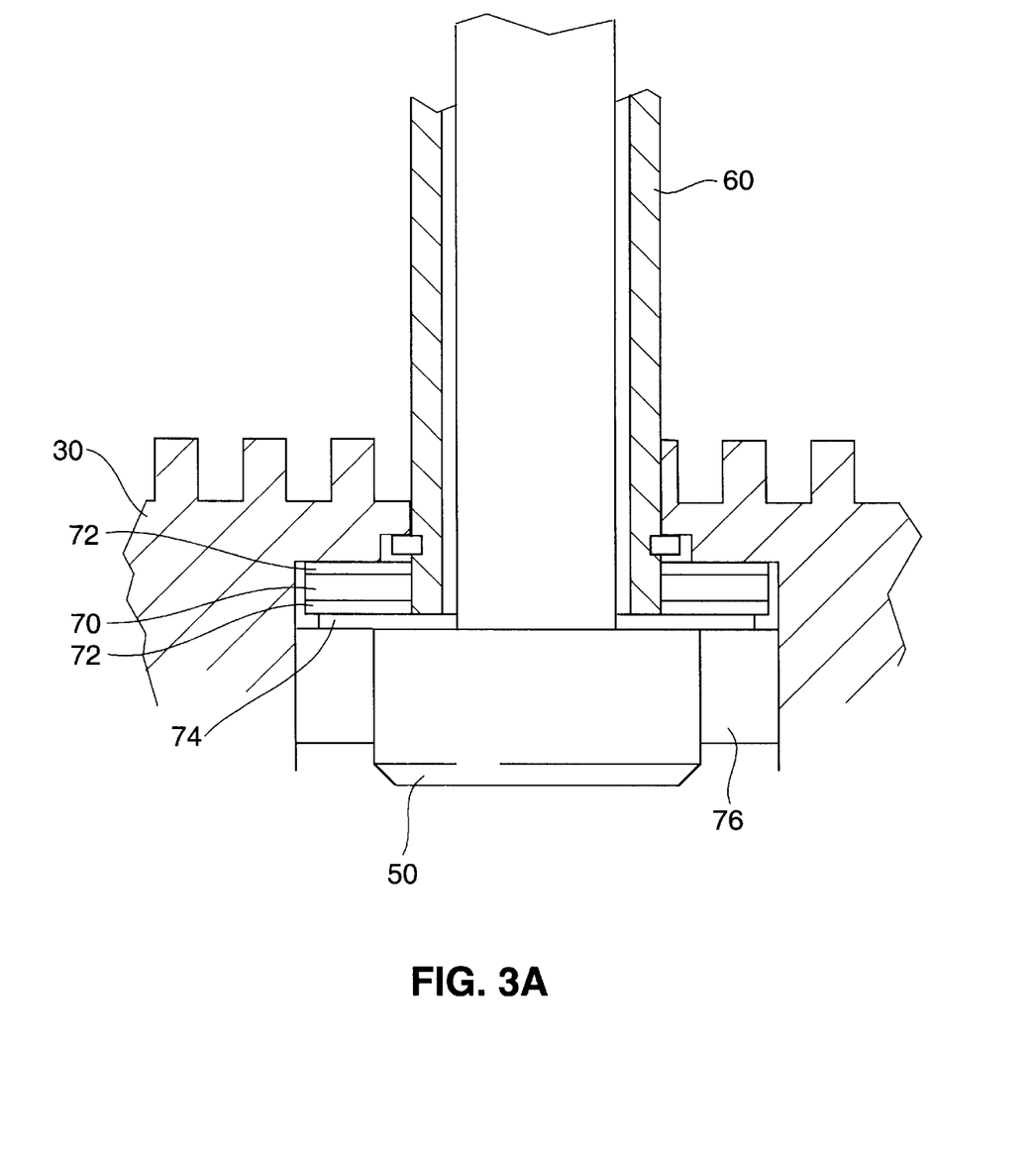
FIG. 3A is an enlarged cross-sectional view of a portion of FIG. 3.

Referring to FIGS. 3 and 3A, a thrust bearing 70 is positioned near the head of the threaded screw 50 inside the knob 30. The thrust bearing 70 is sandwiched between two bearing races 72. A washer 74 is positioned between the thrust bearing 70 and bearing race 72 assembly and the head of the threaded screw 50. When the jaws 40 are in the extended position and abut the Mitchell mount 30, the load on the jaws 24 is transferred to the knob 30. The thrust bearing 70 transfers the load to the head of the threaded screw 50. In addition to transferring the load to the head of the screw 50, the bearing 70 also allows the knob 30 to rotate smoothly. As shown in FIGS. 3 and 3A, a rubber seal 76 is also provided to prevent grease on the bearing 70 from leaking through to the exterior of the knob 30.

A method of using the camera head tie-down device 100 of the present invention to secure a camera head 200 to a Mitchell mount 300 will now be described. First, the assembled camera head tie-down device 100 is secured to the camera head 200 by screwing in the threaded screw 50 to a tapped hole in the bottom of the camera head 200, as shown in FIG. 3.

After the camera head tie-down device 100 is secured to the camera head 200, the camera head tie down device 100 and head 200 assembly is positioned on the Mitchell mount 300 such that the knob 30 of the camera head tie-down device 100 extends through the central opening of the Mitchell mount 300, as shown in FIGS. 3 and 4. In FIG. 3, arrow A shows the direction of insertion of the knob 30 into the Mitchell mount 300. The camera head tie-down device 100 is placed on the Mitchell mount 300 with the first disk 10 facing up while the knob 30 and the second disk 20 are fitted through the central opening in the Mitchell mount 300.

Next, the retractable jaws 40 are extended from the grooves 24 to secure the camera head tie-down device 100 to the Mitchell mount 300. As the knob 30 is rotated by the user in the direction of arrow B, the rotation of the spiral thread 34 on the knob 30 causes the jaws 40 to move in an outward radial direction, in the directions of arrows D and E, along the grooves 24 of the second disk 20. When the jaws 40 are moved in an outward radial direction, the inclined surfaces of the jaws 40 abut the Mitchell mount 300 to lock the camera head tie-down device 100 in place. With the jaws 40 fully extended, the camera head tie-down device 100 and the attached camera head 200 are secured to the Mitchell mount 300.

To remove the camera head tie-down device 100 and the head 200 assembly from the Mitchell mount 300, the knob 30 is rotated in the direction of arrow C to retract the jaws 40. The rotation of the knob 30 retracts the jaws 40 and allows the user to remove the camera head tie-down device 100 and head 200 assembly from the Mitchell mount 300.

Although the present invention has been described with respect to particular embodiments and particular terms, the invention, as claimed, should not be limited to such embodiments and terms. Although an embodiment of the present invention has been described in detail, it is to be understood that various changes may be made by those skilled in the art without departing from the spirit and scope of the invention as defined by the appended claims.

What is claimed is:

1. A camera head tie-down device for securing a camera head having an underside to a camera mount having a central opening, comprising:
a plate attachable to the underside of a camera head, the plate including a locking assembly positionable within the central opening of a camera mount, the locking assembly having a plurality of retractable jaws, the jaws extendable into contact with the perimeter of the central opening of the camera mount when the camera head is secured to the camera mount; and
means for retracting the jaws.

2. The device of claim 1, further comprising:
a connector for attachment to the camera head, the connector being attached to the plate.

3. The device of claim 1, wherein the locking assembly includes a rotatable knob coupled to the jaws, wherein rotation of the knob retracts the jaws.

4. The device of claim 3, wherein the knob has a spiral thread on a flat surface and each of the jaws has at least one thread for engagement with the spiral thread.

5. A camera head tie-down device for securing a camera head having a base to a camera mount, comprising:
a first disk having a central bore;
a second disk smaller than the first disk, the second disk being concentrically attached to the first disk and having a central bore and a plurality of grooves extending from the central bore of the second disk toward an outer edge of the second disk;
a rotatable knob having a central bore;
a plurality of retractable angled jaws, one of the jaws being slidably mounted in each of the grooves and each jaw having at least one thread on a flat surface engaging with a spiral thread on the knob;
a threaded screw fitting through the central bore of the knob, the central bore of the second disk, and the central bore of the first disk.

6. The device of claim 5, wherein rotation of the knob causes the jaws to move along the grooves in a radial direction.

7. The device of claim 5, wherein the knob and the second disk have a same diameter.

8. The device of claim 5, wherein the second disk has three grooves and wherein the three grooves are positioned 120° apart.

9. The device of claim 5, wherein the first disk and the second disk are bolted together.

10. The device of claim 5, wherein the knob has a spiral thread on a flat surface, the spiral thread being centered around the central bore.

11. A camera head tie-down device for securing a camera head having a base to a camera mount, comprising:
a first disk having a central bore and proportioned to receive a camera head;
a second disk smaller than the first disk, the second disk being concentrically attached to the first disk and having a central bore and a plurality of grooves extending from the central bore of the second disk toward an outer edge of the second disk;
a rotatable knob having a central bore and a spiral thread on a flat surface, the spiral thread being centered around the central bore;
a plurality of retractable angled jaws, one of the jaws being slidably mounted in each of the grooves to move in a radial direction along the grooves, each jaw having at least one thread on a flat surface engaging with the spiral thread on the knob;
a threaded screw capable of being screwed into the camera head, the threaded screw fitting through the central bore of the knob, the central bore of the second disk, and the central bore of the first disk.

12. The device of claim 11, wherein the second disk has three grooves and wherein the three grooves are positioned 120° apart.

13. The device of claim 11, wherein the first disk and the second disk are bolted together.

14. A method of securing a motion picture camera head to a camera mount having a central opening, wherein the camera head has a tapped hole, comprising the steps of:
providing a camera head tie-down device comprising:
a first disk proportioned to receive the camera head,
a second disk concentrically attached to the first disk, the second disk having a plurality of grooves,
a jaw slidably mounted within each of the grooves, each jaw having at least one arched thread,
a rotatable knob having a spiral thread on a flat surface, the spiral thread being engaged with the arched thread on the jaws, and
a threaded screw that passes through the first disk, the second disk, and the rotatable knob;
positioning the camera head tie-down device on the camera mount by fitting the knob and the second disk through the central opening of the camera mount; and
extending the jaws by rotating the knob.

15. The method of claim 14, further comprising the step of:

securing the camera head tie-down device to the camera head by screwing the threaded screw into the tapped hole of the camera head to form a camera head tie-down device and camera head assembly prior to positioning the camera head tie-down device on the camera mount.

16. The method of claim 14, wherein the second disk has three grooves and wherein the three grooves are positioned 120° apart.

17. A method of securing a motion picture camera head to a camera mount, comprising the steps of:

(a) providing a camera mount having a central opening, and further providing a tie-down device including a plate having
 a face attachable to a motion picture camera head, and
 a locking assembly having at least two laterally extendable jaw members;

(b) attaching the face to a motion picture camera head;

(c) positioning the locking assembly within the central opening of the camera mount; and (d) with the locking assembly disposed in the central opening, extending the jaw members into engagement with the perimeter of the central opening.

18. The method of claim 19, wherein the locking assembly further includes a rotatable knob coupled to the jaws and the jaws are extended by rotating the knob.

19. The method of claim 18, wherein the camera head tie-down device further comprises a threaded screw that passes through the plate and the rotatable knob.

20. The method of claim 19, further comprising the step of:

securing the camera head tie-down device to the camera head by screwing the threaded screw into the tapped hole of the camera head to form a camera head tie-down device and camera head assembly prior to positioning the camera head tie-down device on the camera mount.

21. A camera head tie-down for securing a camera head to a camera mount having a central opening, comprising:

a plate having a first face attachable to a camera head, and a second face, the first and second faces facing opposite directions;

a locking assembly mounted to the second face, the locking assembly having at least two laterally extendable jaw members, the jaw members including a retracted position in which the locking assembly may be inserted into the central opening of a camera mount, and an extended position in which the jaw members engage the perimeter of the central opening if extended following insertion of the locking assembly into the central opening.

22. A mounting assembly for camera, comprising in combination:

a camera mount having a central opening;

a tie-down device including
 a face attachable to a motion picture camera head, and
 a locking assembly having at least two laterally extendale jaw members, the jaw members moveable between a retracted position in which the locking assembly is insertable into the central opening in the camera mount, and an extended position in which they engage the camera mount at the central opening when moved to the extended position while the locking assembly is in the central opening.

* * * * *